(12) United States Patent
Maertens et al.

(10) Patent No.: US 9,849,921 B2
(45) Date of Patent: Dec. 26, 2017

(54) TRAILER SIDEWALL CONSTRUCTION

(71) Applicant: Titan Trailers Inc., Delhi (CA)

(72) Inventors: Andrew Joseph Maertens, Delhi (CA); Michael Kloepfer, Delhi (CA)

(73) Assignee: Titan Trailers Inc., Delhi (CA)

( * ) Notice: Subject to any disclaimer, the term of this patent is extended or adjusted under 35 U.S.C. 154(b) by 0 days.

(21) Appl. No.: 15/472,902

(22) Filed: Mar. 29, 2017

(65) Prior Publication Data

US 2017/0197672 A1   Jul. 13, 2017

Related U.S. Application Data

(63) Continuation of application No. 15/237,891, filed on Aug. 16, 2016, now Pat. No. 9,701,350, which is a
(Continued)

(51) Int. Cl.
| | |
|---|---|
| *B62D 33/00* | (2006.01) |
| *B62D 33/04* | (2006.01) |
| *B62D 33/033* | (2006.01) |
| *B62D 63/08* | (2006.01) |
| *B60P 3/00* | (2006.01) |
| *B60P 1/00* | (2006.01) |

(52) U.S. Cl.
CPC ............ *B62D 33/046* (2013.01); *B60P 1/006* (2013.01); *B60P 3/00* (2013.01); *B62D 33/033* (2013.01); *B62D 63/08* (2013.01)

(58) Field of Classification Search
CPC .... B62D 33/046; B62D 33/033; B62D 63/08; B60P 1/006; B60P 3/00
USPC ..................................................... 296/186.5
See application file for complete search history.

(56) References Cited

U.S. PATENT DOCUMENTS

| 3,953,170 A | 4/1976 | Webb |
| 4,162,735 A | 7/1979 | Lewis |

(Continued)

FOREIGN PATENT DOCUMENTS

EP   1686083 A1   8/2006

OTHER PUBLICATIONS

Extented European Search Report dated Dec. 8, 2016 issued on the corresponding European Application No. 14845458.0.
(Continued)

*Primary Examiner* — Joseph D Pape
(74) *Attorney, Agent, or Firm* — Jason R. Mueller-Neuhaus; Borden Ladner Gervais LLP

(57) ABSTRACT

A trailer for transporting bulk material has a container mounted on a chassis and wheeled suspension. The container has opposing sidewalls, a floor, a front wall, and a rear opening. The trailer further has an unloading system comprising a plow and a plow motor system. The plow is disposed in the container and shaped and sized to span substantially a transverse cross-section of the container. The plow motor system is operable to move the plow longitudinally in the container to urge or push the bulk material in the container toward and out of the rear opening of the container. At least one of the sidewalls comprises a removable panel installed longitudinally along a bottom of the sidewall, wherein an inward-facing surface of the removable panel and an inward-facing surface of the sidewall are substantially co-planar.

18 Claims, 11 Drawing Sheets

Related U.S. Application Data continuation of application No. 14/891,885, filed as application No. PCT/CA2014/050887 on Sep. 17, 2014, now Pat. No. 9,440,574.

(60) Provisional application No. 61/879,502, filed on Sep. 18, 2013.

(56) References Cited

U.S. PATENT DOCUMENTS

| | | | |
|---|---|---|---|
| 5,507,405 A * | 4/1996 | Thomas | B60P 3/20 220/1.5 |
| 5,683,525 A | 11/1997 | Kemp et al. | |
| 6,357,578 B1 | 3/2002 | Shelby | |
| 6,988,761 B1 | 1/2006 | Stidham et al. | |
| 7,326,023 B2 | 2/2008 | Hagenbuch | |
| 7,500,713 B2 | 3/2009 | Riley et al. | |
| 7,510,071 B2 | 3/2009 | Foster | |
| 8,657,363 B1 | 2/2014 | Roush et al. | |
| 9,090,193 B2 | 7/2015 | Cook et al. | |
| 9,126,520 B2 | 9/2015 | Butterfield | |
| 9,193,522 B2 | 11/2015 | Dixon | |
| 2008/0111393 A1 * | 5/2008 | Ehrlich | B62D 29/045 296/186.5 |
| 2012/0219393 A1 | 8/2012 | Butterfield | |
| 2015/0274054 A1 | 10/2015 | Fliegl, Sr. | |
| 2015/0329159 A1 | 11/2015 | Fliegl, Sr. | |
| 2015/0375661 A1 | 12/2015 | Butterfield | |

OTHER PUBLICATIONS

International Patent Application No. PCT/CA2014/050887, International Preliminary Report on Patentability dated Mar. 31, 2016.
International Patent Application No. PCT/CA2014/050887, International Search Report dated Dec. 15, 2014.
Notice of Acceptance for Australian Patent Application No. 2014324012, dated Sep. 15, 2016.
U.S. Appl. No. 15/237,891, Notice of Allowance dated Mar. 16, 2017.
Written Opinion for Application No. PCT/CA2014/050887, dated Dec. 15, 2014, 3 pages.
Australian Patent Application No. 2016231648, Examination Report dated Sep. 15, 2017.
European Patent Application No. EP14845458, Intention to grant dated Jul. 20, 2017.

* cited by examiner

TRAILER SIDEWALL CONSTRUCTION

CROSS REFERENCE TO RELATED APPLICATIONS

This application is a continuation of U.S. patent Ser. No. 15/237,891 filed Aug. 16, 2016, which is a continuation of U.S. patent application Ser. No. 14/891,885 filed Nov. 17, 2015, which is a National Phase Entry of CA2014/050887 filed Sep. 17, 2014, which claims the benefit of priority of U.S. Provisional Patent Application No. 61/879,502 filed Sep. 18, 2013 which are hereby incorporated by reference.

FIELD

The present invention relates generally to the field of transportation. More particularly, the present invention relates to a trailer for the transportation of bulk materials.

BACKGROUND

Trailers are commonly used for the transportation of bulk aggregate material such as gravel, stone, grain, coal, and the like. Generally, a trailer includes a chassis mounted on a wheeled suspension with wheels for rollably driving the chassis on the ground, and a rigid container carried by the chassis. The rigid container comprises a floor, opposing sidewalls, a front wall, and a rear gate which may be opened for loading/unloading bulk materials into the container. The container may include a roof, or may include a top opening for loading of bulk materials into the container. Some trailers include moving or walking floors for unloading the bulk materials transported by the trailer. In order to empty the container, some trailers include a plow which cooperates with the moving floor to urge or push bulk material contained in the container toward and out of a rear-facing opening of the container, and in this manner the container may be unloaded and emptied of the bulk material without tilting of the trailer or container.

If materials are left over following an unloading operation of the walking floor and plow, an operator such as a driver may have to enter the container to sweep out the material that was left behind, especially if the driver is hauling a different material on the next load as in most cases cross contamination of materials when switching between aggregate materials from load to load is undesirable. The expenditure of such time and effort is undesirable, and moreover, for safety reasons, it is usually undesirable to have drivers entering the trailer to clean them out.

It is desirable, therefore, to make improvements to conventional automatic unloading and cleaning systems of walking floor trailers so as to maximum the amount of a carried bulk material which is unloaded by operation of the system.

BRIEF DESCRIPTION OF THE DRAWINGS

Embodiments of the present disclosure will now be described, by way of example only, with reference to the attached drawings, as follows.

DESCRIPTION

The improved transportation trailer disclosed herein obviates or mitigates at least one disadvantage of conventional approaches described above.

The trailer is characterized by a longitude which extends parallel to the sidewalls, and perpendicular to the front wall, and a transverse which extends generally parallel to the front wall and generally perpendicular to the sidewalls and longitude. The adjectives "longitudinal" and "transverse" are used herein consistently with this definition of the longitude and transverse. The terms "bottom", "downward", "lower", and the like are intended to indicate a position relatively proximal to a ground supporting the wheels of the trailer, or a direction proceeding generally from the top opening of the trailer to the ground. Similarly, the terms "top", "upward", "upper", and the like are intended to indicate a position relatively distal from the ground, or a direction proceeding generally from the ground to the top opening of the trailer. The terms "inward", "inwardly", "inner", and the like are intended to indicate a position or direction relatively proximal to or toward a transverse center of the trailer, while terms such as "outward", "outwardly", "outer", and the like are intended to indicate a position or direction relatively distal or away from the transverse center of the trailer.

Figure 1:
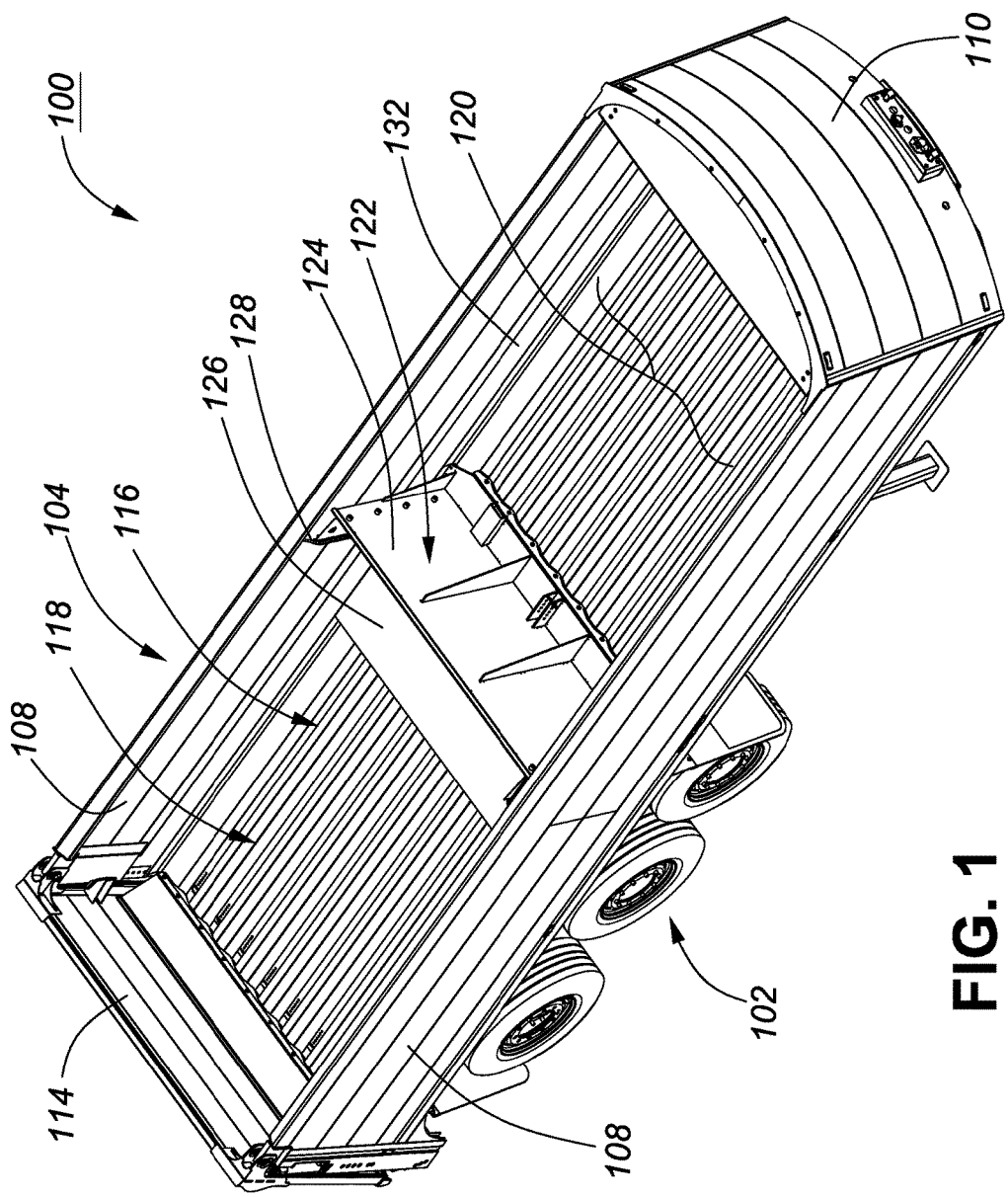
FIG. 1 is a front perspective view of a trailer according to some embodiments.
Figure 2:
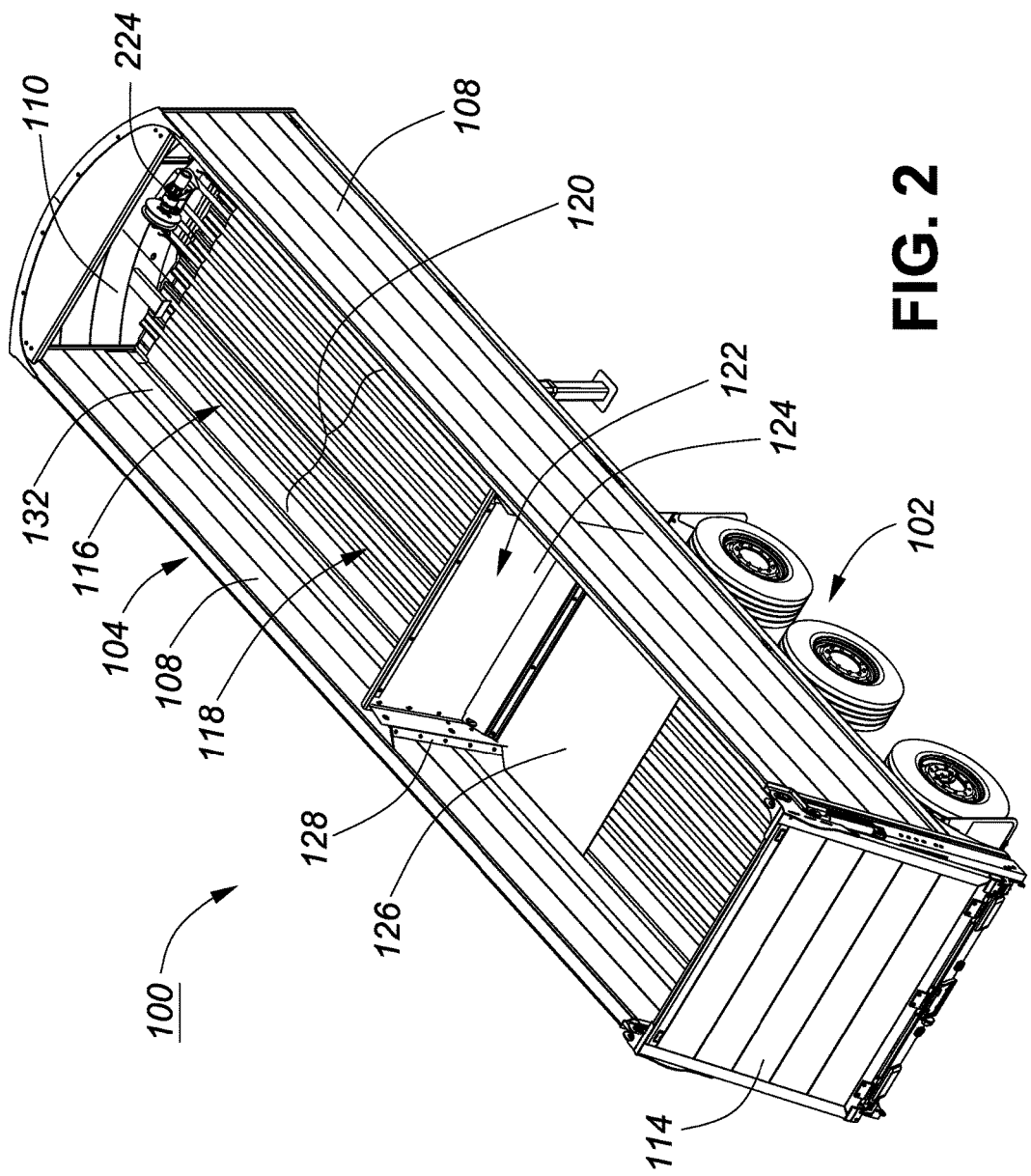
FIG. 2 is a rear perspective view of the trailer of FIG. 1.
Figure 3:
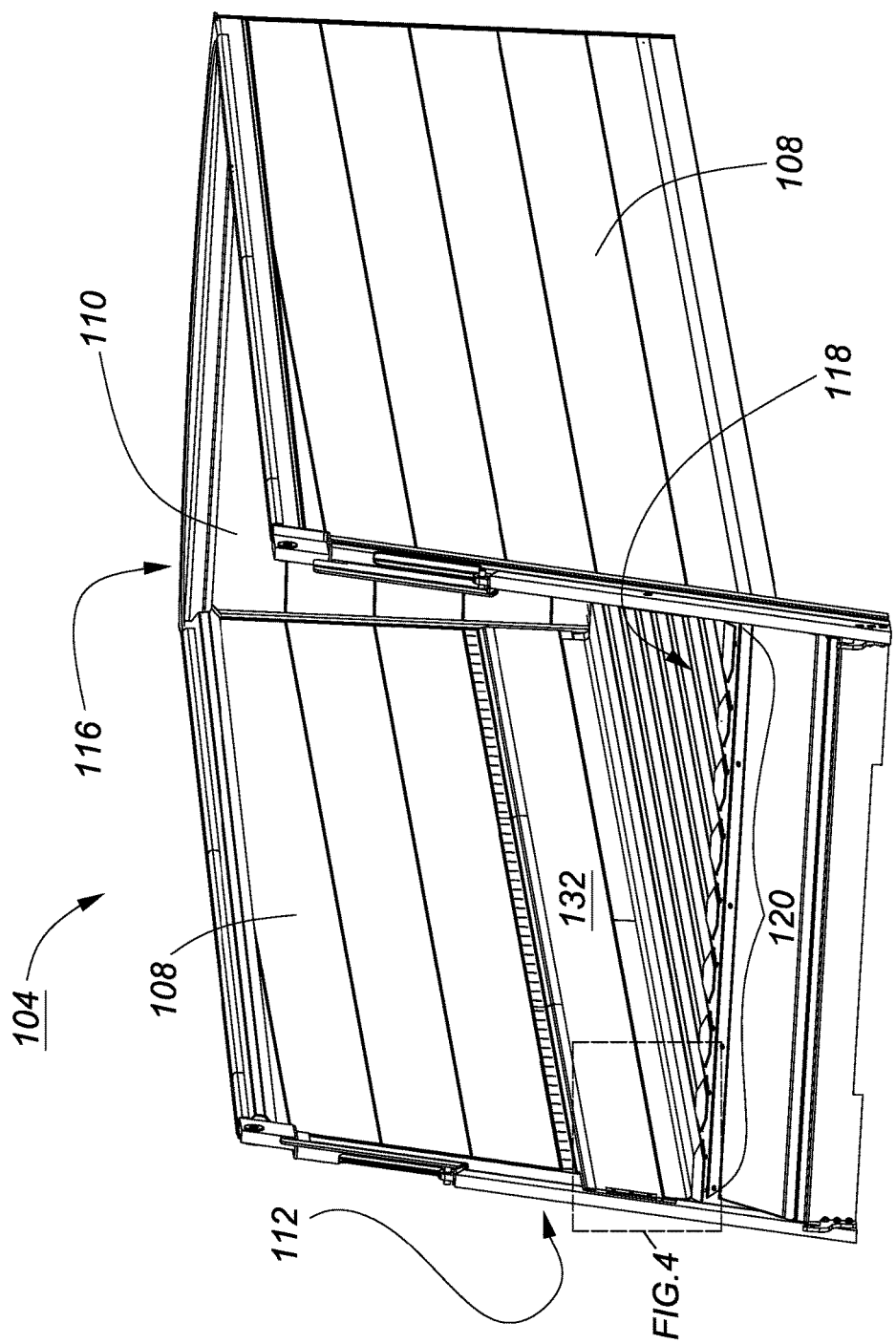
FIG. 3 is a rear perspective view of an embodiment of a container for the trailer of FIG. 1.
Figure 4:
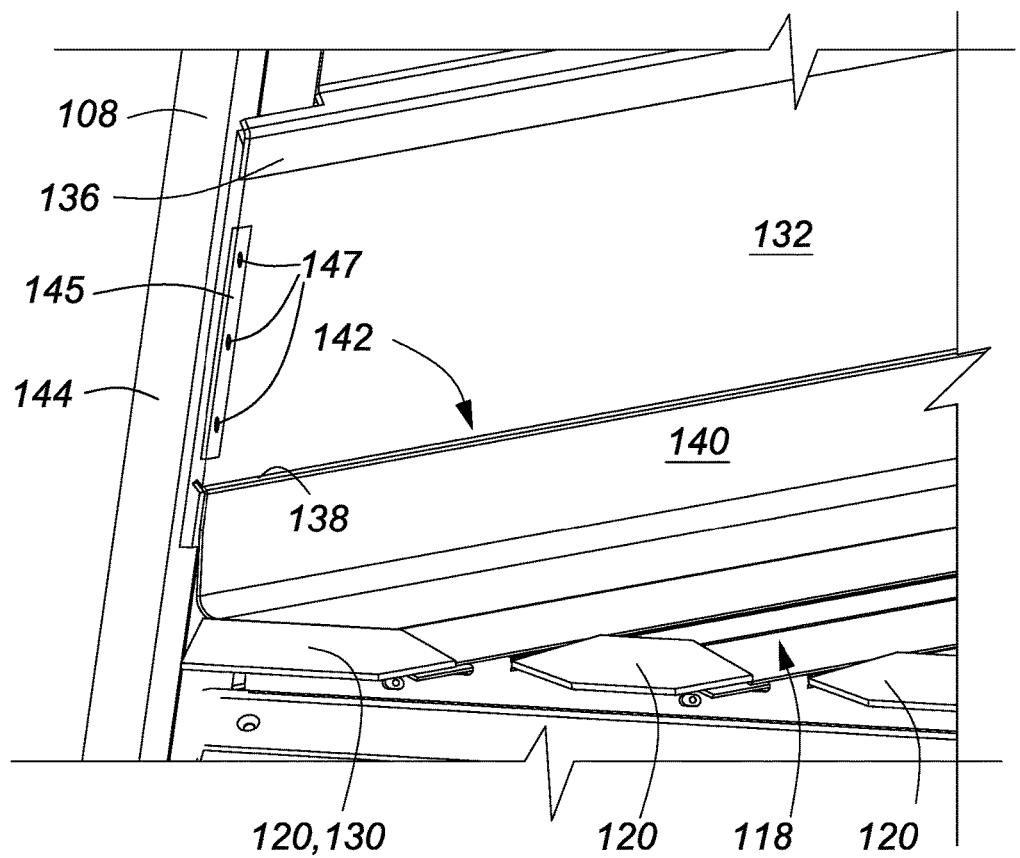
FIG. 4 is a partial rear perspective view of a lower rear corner of the container of FIG. 3.
Figure 5:
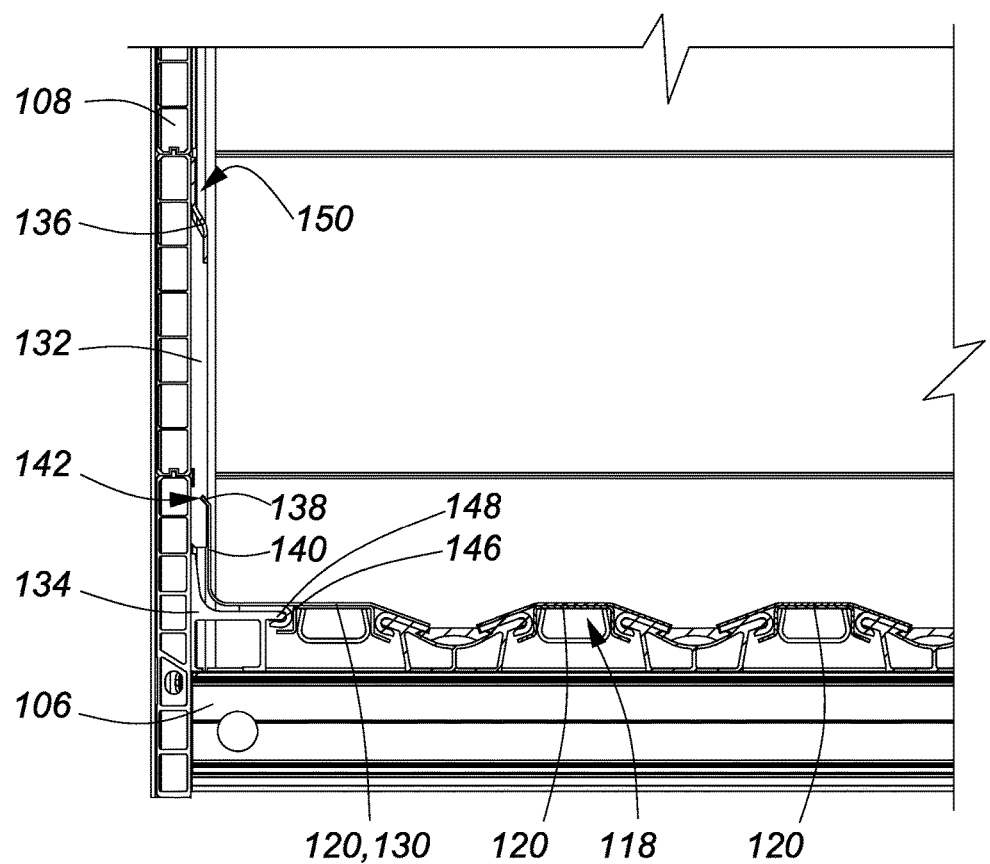
FIG. 5 is a partial rear cross-sectional view corresponding to the partial rear perspective view of FIG. 4.
Figure 6:
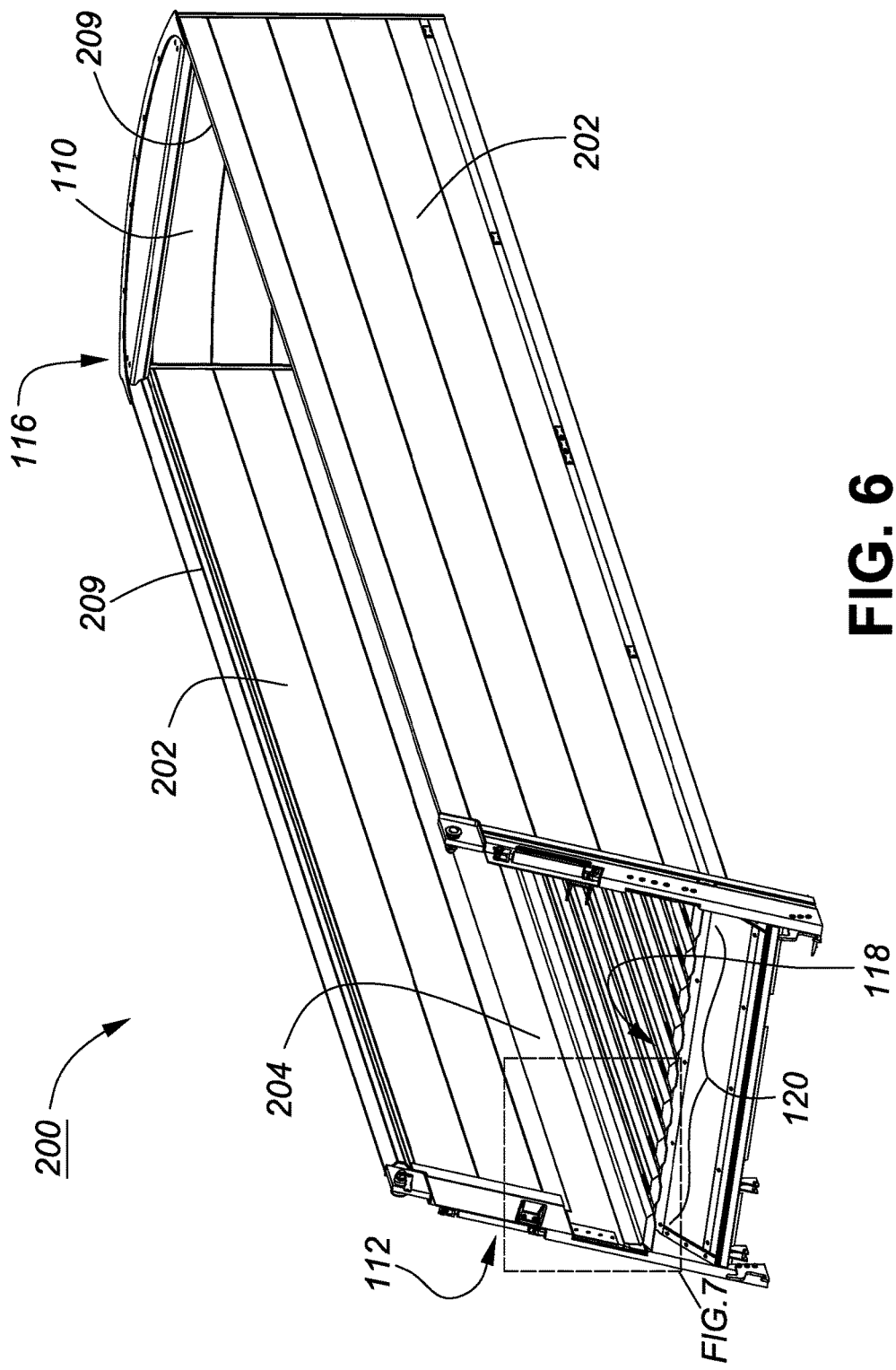
FIG. 6 is a rear perspective view of another embodiment of a container for the trailer of FIG. 1.
Figure 7:
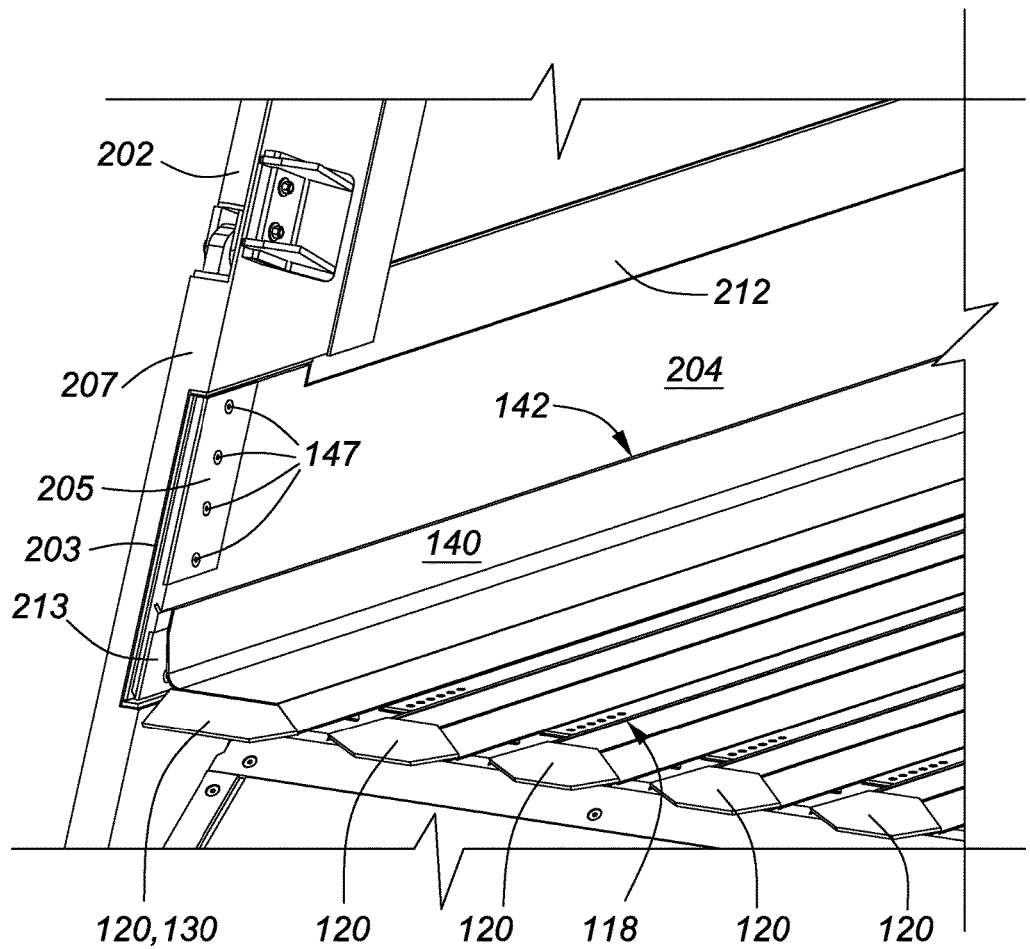
FIG. 7 is a partial rear perspective view of a lower rear corner of the container of FIG. 6.

FIGS. 1 and 2 show an embodiment of an improved transportation trailer 100. The trailer 100 has a chassis (not shown) mounted on and carried by a wheeled suspension 102 including wheels for rollably driving the chassis on the ground, and a rigid container 104 mounted on and carried by the chassis. FIG. 3 shows the rigid container 104 in isolation from the wheeled suspension 102, FIG. 4 shows a perspective view of a lower rear corner of the container 104, and FIG. 5 shows an end cross-sectional view of the same lower rear corner. The rigid container 104 comprises a floor 106 (shown particularly in FIG. 5), opposing sidewalls 108, a front wall 110, and a rear opening 112 (shown particularly in FIG. 3) for loading/unloading bulk materials into the container 104. The trailer 100 may also have a rear gate 114 which when closed retains the bulk materials in the container 104 and when open allows the bulk materials to be unloaded through the rear opening 112. The container 104 may include a roof or may include a top opening 116 for loading bulk materials into the trailer 100.

In some embodiments, one or more of the sidewalls 108, front wall 110, and rear gate 114 are constructed of extruded aluminum panels, though it will be appreciated that alternative materials and fabrication methods are possible.

In some embodiments, the trailer 100 includes a moving or walking floor 118 for unloading the materials transported by the trailer 100. The walking floor 118 includes a plurality of longitudinal slats 120 provided in parallel and movable longitudinally back and forth in a reciprocating manner. While in motion to load and/or unload materials in the trailer 100, alternate slats 120 may move in opposite directions.

In some embodiments, the slats 120 are constructed of steel, though it will be appreciated that alternative materials and fabrication methods are possible.

The trailer 100 further has an unloading system including a plow 122 having an upright blade 124 shaped and sized with so as substantially to span a transverse cross-section of the container 104 perpendicular to the longitude of the container 104. At the beginning of an unloading operation, the plow 122 is positioned near a forward end of the container 104 proximal the front wall 110 and distal from a rear opening 112 of the container 104, and is movable by the slats 120 of the walking floor 118 or otherwise toward the rear opening 112 of the container 104 so as to urge or push the material contained in the container 104 toward and out of such rear opening 112, and in this manner the container 104 may be unloaded and emptied of the material without tilting of the trailer 100 or container 104.

The plow 122 is sized and shaped so as to provide only a slight gap between each lateral edge of the plow 122 and each inward-facing surface of an adjacent sidewall 108 of the container 104, so as to be fittingly slidable therealong, in order to maximum an amount of the bulk material contained in the container 104 that is urged or pushed by the plow 122 and emptied from the container 104.

In addition to the upright blade 124, the plow 122 may also have a plow base 126 generally comprising one or more layered sheets of material mounted near a bottom edge of the upright blade 124, and sized and shaped to span the container 104 transversely between the sidewalls 108 and to extend a distance toward the rear opening 112. A top one of the layered sheets may be made of a smooth and slippery material. The sheets may have any suitable thicknesses which may depend on the number of layers and type of material used. The plow base 126 rests on the walking floor 118 and a bulk material loaded into the container 104 rests in part on the plow base 126. The sheets of the plow base 126 may be flexible and take the shape of the floor to facilitate operation of the plow 122. Sufficient bulk material may be loaded onto the sheets to create sufficient downward pressure to facilitate movement of the plow 122 steadily and consistently with the walking floor 118. The sheets of the plow base 126 may have the same length, or multiple lengths, suitable for facilitating movement of the plow 122 and the bulk material resting on the plow base 126. In alternative embodiments, the plow base 126 is flexible, as described above, or is rigid. During an operation of the plow 122, the plow base 126 carries part of the bulk material resting on the plow base 126 as the plow 122 moves toward the rear opening 112 of the container 104. In some embodiments, when the plow 122 reaches a rearmost extent of motion, the plow base 126 extends rearwardly beyond rear opening 112 to assist in complete removal of bulk material from the container 104.

In some embodiments, the plow 122, including the upright blade 124 and plow base 126, are constructed of steel, though it will be appreciated that alternative materials and fabrication methods are possible.

In some embodiments, the plow 122 is provided with a number of wipers 128 formed of a sturdy but flexible material. Each wiper 128 is a strip of material mounted at a corresponding edge of the upright blade 124 of the plow 122, and which functions similarly to a squeegee, passing with contact along an inward-facing surface of an adjacent sidewall 108 of the container 104 as the plow 122 moves longitudinally, to prevent or deter passage of bulk material between the plow 122 and the inward-facing surface of the sidewall 108. A wiper 128 may be mounted at each edge of the upright blade 124 of the plow 122 which is adjacent to and moves along a corresponding inward-facing surface of the container 104, wherein the wiper 128 abuts and makes contact with the inward-facing surface. In some trailers 100 having this arrangement, and in connection with some kinds of bulk material, the provision of such wipers 128 is sufficient to maximize emptying of the container 104.

In some embodiments, the flexible material is a Kevlar™ felt material; this material provides an advantage of heat tolerance, and can handle the high temperature applications associated with hauling asphalt, for example. Other embodiments use a rubber material, plastic material, or vinyl materials.

In some embodiments, as shown particularly in FIGS. 3 to 5, one of the slats 120 of the walking floor 118 is a corner slat 130 extending longitudinally along a bottom corner of the container 104 formed by the floor 106 and an adjacent sidewall 108. The corner slat 130 extends upwardly and transversely from the corner. A corner slat 130 may be provided at each sidewall 108 of the container 104. The corner slats 130 are useful for improving trailer 100 emptying during unloading of various bulk aggregate materials. In configurations lacking corner slats 130, a dead space is created at the adjacent corner which frustrates removal of material therefrom.

While trailer containers are often constructed of a sturdy metal such as sheet steel, sheet aluminum, or extruded aluminum panels, it is sometimes desirable to construct at least a part of the inside of the container of another material in order to achieve some desired result. For example, certain kinds of bulk material may exhibit lower friction with materials different from those typically used to construct trailer containers, and thus it is desirable to provide inner surfaces of the container with such lower-friction material if possible in order to reduce frictional resistance during unloading. This is especially, but not exclusively, the case along sections of the inner sidewalls of the container nearest the floor of the container where the greatest weight of material is applied to the inner surfaces of the container and thus the greatest friction is experienced.

In addition, in cold climates, it is sometimes experienced that the bulk material freezes thereby frustrating the unloading process, but that the provision of materials other than typical container materials on inside surfaces of the container may address this problem. For example, while constructing container sidewalls of extruded aluminum panels provides certain advantages, it is known that certain kinds of contents tend to freeze more quickly in such containers than those constructed of alternative materials such as steel. In such cases, it is desirable to provide the sidewall with additional components which address the problems associated with enhanced friction.

Thus, in some embodiments, to create a seal between a top edge of the corner slat 130 and the adjacent sidewall 108, a removable panel 132 is installed along a lower portion of the sidewall 108, just above a corner seal 134 (shown particularly in FIG. 5) which is mounted (by welding, with fasteners, or by any other suitable method) at an outside face of the corner seal 134 to the adjacent sidewall 108, and is supported from below by the floor 106 of the container 104. In some embodiments, the removable panel 132 is installed by sliding the removable panel 132 longitudinally into a channel sized and shaped for fittingly and slidingly receiving the removable panel 132 at an end of the channel proximal the rear opening 112. The removable panel 132 may be held in place laterally by the corner slat 130 as well as a top cap 136 mounted to the sidewall 108 above the removable panel 132, wherein the top cap 136 extends downwardly over the top of the removable panel 132 to cover the top of the removable panel 132 and to prevent material from passing behind the removable panel 132. The corner slat 130 may be formed with an upper tongue 138 along a length of the corner slat 130, wherein the upper tongue 138 is bent outwardly from a vertical plane of an upward-extending arm 140 of the corner slat 130. The removable panel 132 may be formed with a slot 142 sized and shaped to receive the upper tongue 138 of the corner slat 130 such that when the upper tongue 138 is received in the slot 142 and an outward-facing surface of the corner slat 130 contacts an inward-facing surface of the removable panel 132, the corner slat 130 holds the removable panel 132 traversely against the adjacent sidewall 108 while permitting longitudinal movement of the corner slat 130 relative to the removable panel 132. In such case, the adjacent sidewall 108, the top cap 136, the corner seal 134, and the corner slat 130 may be understood as forming the channel in which the removeable panel 132 is received.

At the rear of the container 104, proximal to the rear opening 112, the removable panel 132 may be bolted to a rear post 144, but the removable panel 132 may be unrestrained at the front end of the container 104 thereby allowing the removable panel 132 to expand and contract towards the front of the container 104 and avoid buckling, twisting, or other distortion due to thermal expansion and contraction. Alternatively, the removable panel 132 may be mounted proximal to the front wall 110 of the container 104, and in this respect may be bolted to a front post (not shown) or otherwise fastened near the front end while remaining unrestrained at the rear end of the container 104 to allow expansion and contraction of the removable panel 132. A fastening plate 145 may be provided for clamping the removable panel 132 to the rear post 144, and the removable panel 132 may be provided with a recess or relief sized and shaped fittingly to receive the fastening plate 145 such that when the fastening plate 145 is installed over the removable panel 132 to clamp the removable panel 132 to the rear post 144, the removable panel 132 and the fastening plate 145 provide a flush inside-facing surface. The fastening plate 145 and the removable panel 132 may be provided with through holes sized and shaped to receive bolts 147 for passage through to fastening at the rear post 144. The through holes in the fastening plate 145 may be countersunk such that heads of the bolts 147 are also flush with inside-facing surfaces of the fastening plate 145 and the removable panel 132.

In some embodiments, the removeable panel 132 has a length which is approximately, and extends substantially an entire length of, the sidewall 108 in which it is installed, such that the removable panel 132 extends substantially an entire distance between an inside-facing surface of the front wall 110 of the container 104 and the rear post 144 to which it is mounted, with allowance for longitudinal expansion. In other embodiments, the removable panel 132 extends less than the distance from the rear post 144 to the front wall 110, and in some embodiments the removable panel 132 extends toward a front of the container 104 to about a forwardmost position of travel of the plow 122.

The removable panel 132 may be formed of ultra-high-molecular-weight polyethylene ("uhmw") or another desired material. Uhmw plastic is widely used in the transportation industry in dump trailers to allow material to slide out of the trailer with ease. It also acts as a very good wearing material that can be easily replaced over time as it becomes worn out. It is much easier to replace a uhmw removable panel than to replace structural aluminum sheet or plate as it becomes worn out over time. On walking floor trailers, it is sometimes the lowest rear most portion on the sidewall that experiences the heaviest wear.

The corner seal 134 may be configured to provide support to the corner slat 130, and in this regard the corner slat 130 may have, or be mounted to, at a lower side thereof a groove 146 sized and configured to receive a horizontal tongue 148 of the corner seal 134, such that the groove 148 tends to resist vertical motion of the corner slat 130 along a length of the tongue 148. The corner seal 134 may also be configured to contact and support the corner slat 130 from beneath.

Providing the removable panel 132 on the sidewall 108 in this way creates, however, an offset profile or ridge 150 inside the container 104, as particularly shown in FIG. 5. The offset profile 150 may interfere with providing a seal between the plow wiper 128 and inward-facing surface of the container 104 during unloading thereby permitting material to slip past the wiper 128 and fall onto the walking floor 118 behind the plow 122. As noted above, providing a removable panel 132 at a lower portion of the inward-facing surface of each sidewall 108 of the container 104 is sometimes desirable, however, to provide a lower-friction area during unloading.

In order to address the above issues, and to enable the use of removable panels 132 such as plastic uhmw, while still enabling reliable unloading of material using an automatic unloading system, an improved container 200 having improved sidewalls 202 for use with improved removable panels 204 is provided as shown in FIGS. 6 to 9. The container 200, sidewalls 202, and removable panels 204 are respectively similar to the container 104, sidewalls 108, and removable panels 132 described above, but with the following improvements.

The improved sidewall 202 is provided with a sidewall relief 206 to receive a removable panel 204, thereby providing the sidewall 202 including the removable panel 204 with a flat, smooth surface inside the container 200 with no offset profile. The removable panel 204 is fastened at the rear end of the trailer 100 to an improved rear post 207 which is provided with a corresponding relief or recess. In one embodiment, the sidewall 202 is manufactured from 1.5" thick aluminum extruded panels, though it will be appreciated that other options may be used so long as the requisite structural integrity is provided. Each sidewall 202 may be provided with a top panel having a top rail 209 which is formed integrally with or welded to the top panel, thereby simplifying construction of the sidewall 202. Moreover, by providing an integral extruded top rail 209, a savings in sidewall 202 weight is achieved along with improved structural characteristics as the additional welding process ordinarily employed to connect a singular top rail profile to a sidewall assembly has been eliminated, thus in turn eliminating the heat input ordinarily applied by the welding process.

It is desirable to select the thickness of the removable panel 204 so as to avoid excess warping and expansion and contraction when in direct sunlight. In some embodiments a 0.75" thickness of uhmw is used for the removable panel 204 as it tends to keep its shape consistantly. This allows use of a 2.25" aluminium extruded panel above and below the removable panel 204, thus creating the smooth or flush inside surface.

As indicated above, the removable panel 204 is fastened to an improved rear post 207 at the rear of the container 200, proximal to the rear opening 112, and may remain unrestrained at the front end of the container 200 thereby allowing the removable panel 204 to expand and contract towards the front of the container 200 and avoid buckling, twisting, or other distortion due to thermal expansion and contraction. As was the case with the container 104 above, an upper fastening plate 205 may be provided for clamping the removable panel 204 to the rear post 207, and the removable panel 204 may similarly be provided with a recess or relief sized and shaped fittingly to receive the upper fastening plate 205 such that when the upper fastening plate 205 is installed over the removable panel 204 to clamp the removable panel 204 to the rear post 207, the removable panel 204 and the upper fastening plate 205 provide a flush inside-facing surface. Likewise, the upper fastening plate 205 and the removable panel 204 may be provided with through holes sized and shaped to receive bolts 147 for passage through to fasten at the rear post 207. The through holes in the upper fastening plate 205 may be countersunk such that heads of the bolts 147 are also flush with inside-facing surfaces of the upper fastening plate 205 and the removable panel 204.

Figure 8:
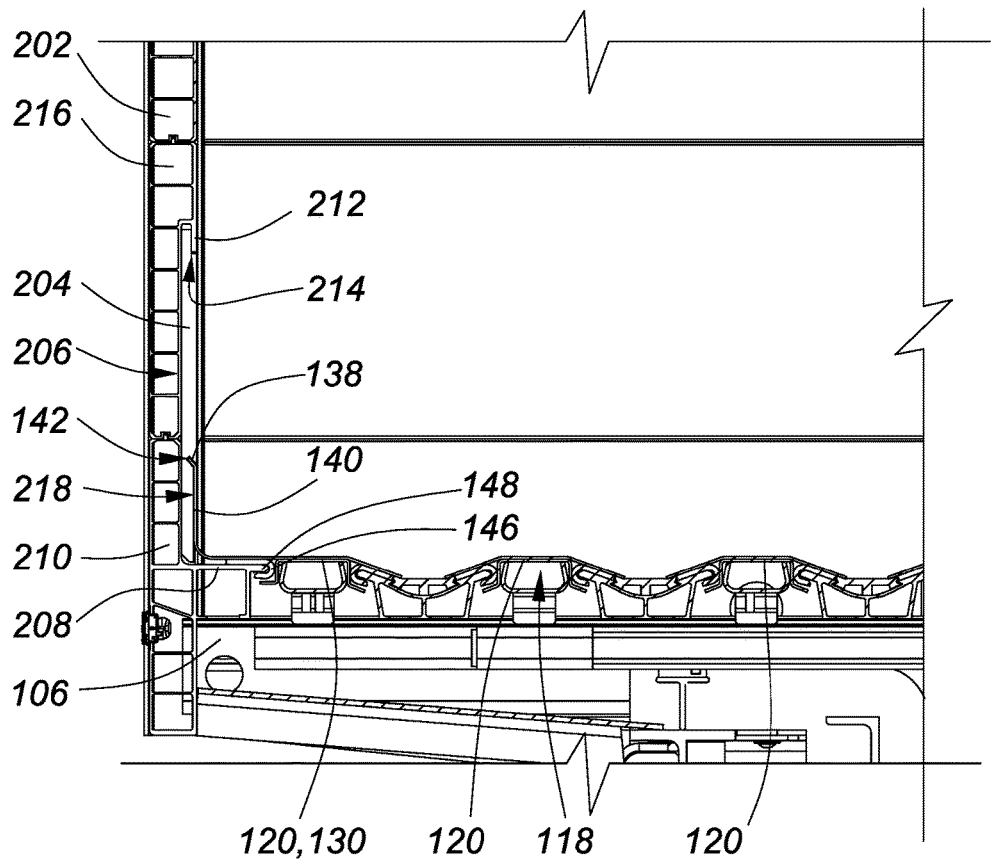
FIG. 8 is a partial rear cross-sectional view corresponding to the partial rear perspective view of FIG. 7.
Figure 9:
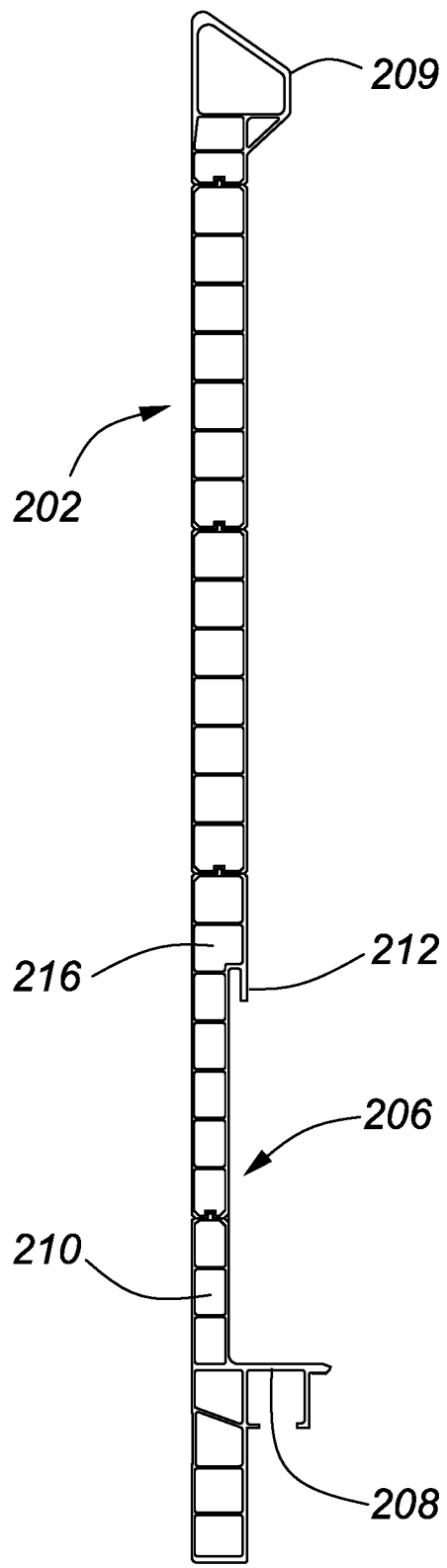
FIG. 9 is a cross-sectional end view of a sidewall of the container of FIG. 6.

In some embodiments, the sidewall 202 may be constructed so as to provide an integral corner seal 208 similar to corner seal 134. For example, where the sidewall 202 is constructed of extruded panels, such as extruded aluminum panels, a bottom panel 210 of the sidewall 202 may be extruded so as to include the integral corner seal 208, as shown in FIG. 8. In this way, welding or other fastening or joining of corner seal 134 may be eliminated, while a structurally superior corner seal 208 is provided. In particular, by avoiding the welding process normally employed to connect a side seal to a sidewall, the application of heat ordinarily required for the welding process has been eliminated, and in this way superior structural characteristics are achieved. In one embodiment, the bottom panel 210 has a first thickness, for example 2.25", below the removable panel 204, and beginning at a top surface of the integral corner seal 208 has a second thickness less than the first thickness, for example 1.5" thick. The difference between the first and second thicknesses may be determined at least in part by, and may be provided to make the sidewall relief 206 having a depth approximately equal to a thickness of the removable panel 204.

Providing the integral corner seal 208 enables lowering of the removable panel 204 along the sidewall 202 to rest on the corner seal 208. By way of comparison, in the embodiment of FIG. 5 the removable panel 132 is placed above and rests atop an upper edge of the corner seal 134, thus creating a gap at a rear end of the corner slat 130 between the corner slat 130 and the rear post 144. In such a configuration, bulk material such as stones tend to be caught in a gap (in some cases, a 0.84" gap) and tend to scar the rear post 144 and dent the corner slat 130. With the removable panel 204 lowered and resting on an upper surface of the integral corner seal 208, however, there is no gap at the rear for stones or other bulk material to be caught in, and the corner slat 130 has only a small gap (in some cases, a gap of approximately 1/16") between it and the rear post 144 at the rear of the trailer 100.

As noted above, sidewall 108 of container 104 has a top cap 136 mounted to the sidewall 108 to hold the removable panel 132 in place laterally as well as to prevent material from passing behind the removable panel 132. In the improved sidewall 202 of container 200, an integral retaining flange 212 is provided which assists in holding the removable panel 204 in place laterally as well as sealing a top portion of the removable panel 204 preventing material from passing in behind the removable panel 204. The removable panel 204 may be machined or otherwise provided along the top portion with a retaining flange relief 214 sized and configured to slidingly receive and cooperate with the retaining flange 212. The retaining flange relief 214 has an inward-facing surface which contacts and outward-facing surface of the retaining flange 212. An inward-facing surface of the retaining flange 212 is substantially coplanar with the inward-facing surface of the removable panel 204. In one embodiment, the sidewall 202 has a second panel 216 mounted above the bottom panel 210, and the second panel 216 has a thickness of about 2.25" thickness at the retaining flange 212, and a thickness of about 1.5" at the along the sidewall relief 206.

In one embodiment, the removable panel 204 has a height of approximately 15.75" and is formed of uhmw, though it will be understood that other dimensions and suitable materials may be used. The sidewall 202 panels may be configured so as to enable differently sized removable panels 204. As noted, in other embodiments the removable panel 204 may be formed of different materials, and need not be limited to plastic uhmw. In some embodiments, the removable panel 204 could be formed of a composite or steel or another aluminum extruded insert.

As noted above, the respective sidewalls 108, 202 and removable panels 132, 204 of the above containers 104, 200 are provided to address the problem of passage of bulk material past the wipers 128 of the plow 122. The inventors have made the surprising discovery that even very small profiles, ridges, or protrusions from the sidewall can result in passage of bulk material past the wipers in some circumstances. A prototype trailer similar to trailer 100 having container 200 was manufactured with sidewalls formed of extruded aluminum panels having uhmw removeable panels, and additionally a 3/16" thick aluminum liner was welded to one of the sidewalls above the retaining flange. The aluminum liner extended from just under a top rail of the sidewall to about 0.75" above the retaining flange on the second panel. It was originally expected that this liner would not pose a problem for unloading. Upon testing removal of several loads of bulk material including small stone chops, however, it was surprising observed that the bulk material could escape past this small transition area and fall on the floor behind the plow. Further tests were conducted wherein the bulk material was piled on one side of the container high above this transition and the other side low just below the transition. The low side cleaned out spotlessly with no material escaping past the plow, which on the high side material escaped past the transition area leaving material behind. This problem was demonstrated on both sides of the trailer. It was also observed during the unloading operation that small stone chips clinged or grabbed onto the aluminum sidewall, whereas on the uhmw removable panel the stone chip would simply slide along and not grip the uhmw plastic, which also assisted in the positive unloading results. Without being bound to any particular theory, it is suspected that this behaviour results from certain combinations of sidewall material, such as aluminum, and certain bulk materials, such as small stone chips, wherein the materials have a greater tendency to cling, grab onto, or otherwise resist movement along the sidewall surface.

It has thus been determined that it is advantageous to have sidewall inside surfaces which are as flush as possible to achieve proper material unloading, with the inward-facing surfaces of all components, including the sidewall inner surface and the removable panel, being coplanar. It is believed that in some combinations this condition is met if no profile, ridge, or protrusion from the sidewall is greater than 1/16" in extension.

In order to achieve sidewall inner surfaces which are as coplanar as possible, the removable panels 204 are sized and configured so as to provide a precisely coplanar alignment of the inward-facing surfaces of the sidewall 108, removable panel 204, and the upward-extending arm 140 of the corner slat 130. The removable panel 204 is machined or otherwise provided with a lower panel relief 218 along an upward-extending arm 140 of the corner slat 130 of the walking floor 118 so as to provide a recess for receiving the upward-extending arm 140 of the corner slat 130. In this way, an inward-facing surface of the upward-extending arm 140 of the corner slat 130 may be made precisely coplanar with the inward-facing surface of the removable panel 204, which is coplanar with the inward-facing surface of the aluminum sidewall 202 at the retaining flange 212. In this way, a fully coplanar inward-facing surface of the assembled container sidewall may be provided.

In some embodiments, a portion of the removable panel 204 near a rear end of the container 200 may be provided with a further inside-facing recess or relief for receiving a lower fastening plate 213 for clamping the removable panel 204 to the rear post 207 in cooperation with the upper fastening plate 205, and apart from its height is similar to the upper fastening plate 205. The lower fastening plate 213 may be disposed outwardly of—that is, behind—the upward-extending arm 140 of the corner slat 130. In some embodiments, the rear post 207 is formed of an extruded panel, which may be an extruded aluminum panel, and the relief or recess in the rear post 207 for receiving the removable panel 204 is provided by omitting during extrusion or machining away an inside-facing surface of the rear post 207. In some embodiments, a further mounting plate 203 (shown in FIG. 7) is mounted to the rear post 207 in the relief or recess provided in the rear post 207, and the removable panel 204 is mounted to the mounting plate 203 using the upper fastening plate 205 and the lower fastening plate 213, such that the upper fastening plate 205 and the lower fastening plate 213 each sandwich the removable panel 204 and the mounting plate 203 with the rear post 207. In such case, the relief or recess provided in the rear post 207 has a depth substantially equal to a combined thickness of the mounting plate 203, the removable panel 204 at the rear post 207, and each of the upper fastening plate 205 and the lower fastening plate 213. In some embodiments, the removable panel 204 is provided with another outside-facing recess or relief sized and shaped to receive the mounting plate 203. In any event, the components are so sized, shaped, and constructed so as to provide a continuous, flush inside-facing surface of the removable panel 204 and the sidewall 202.

As noted above, in some embodiments the rear post 207 is formed of an extruded panel, which may be an extruded aluminum panel. The rear post 207 may be provided with internal tabs, as part of the extrusion process, wherein the tabs are partial internal webs. The mounting plate 203 may be plug welded or otherwise fastened to the internal tabs of the rear post 207. The rear post 207 may be provided on an outside-facing surface of the rear post 207 with through holes for providing access to nuts which cooperate with the bolts 147 to clamp the removable panel 204 onto the mounting plate 203 using the upper fastening plate 205 and the lower fastening plate 213.

Figure 10:
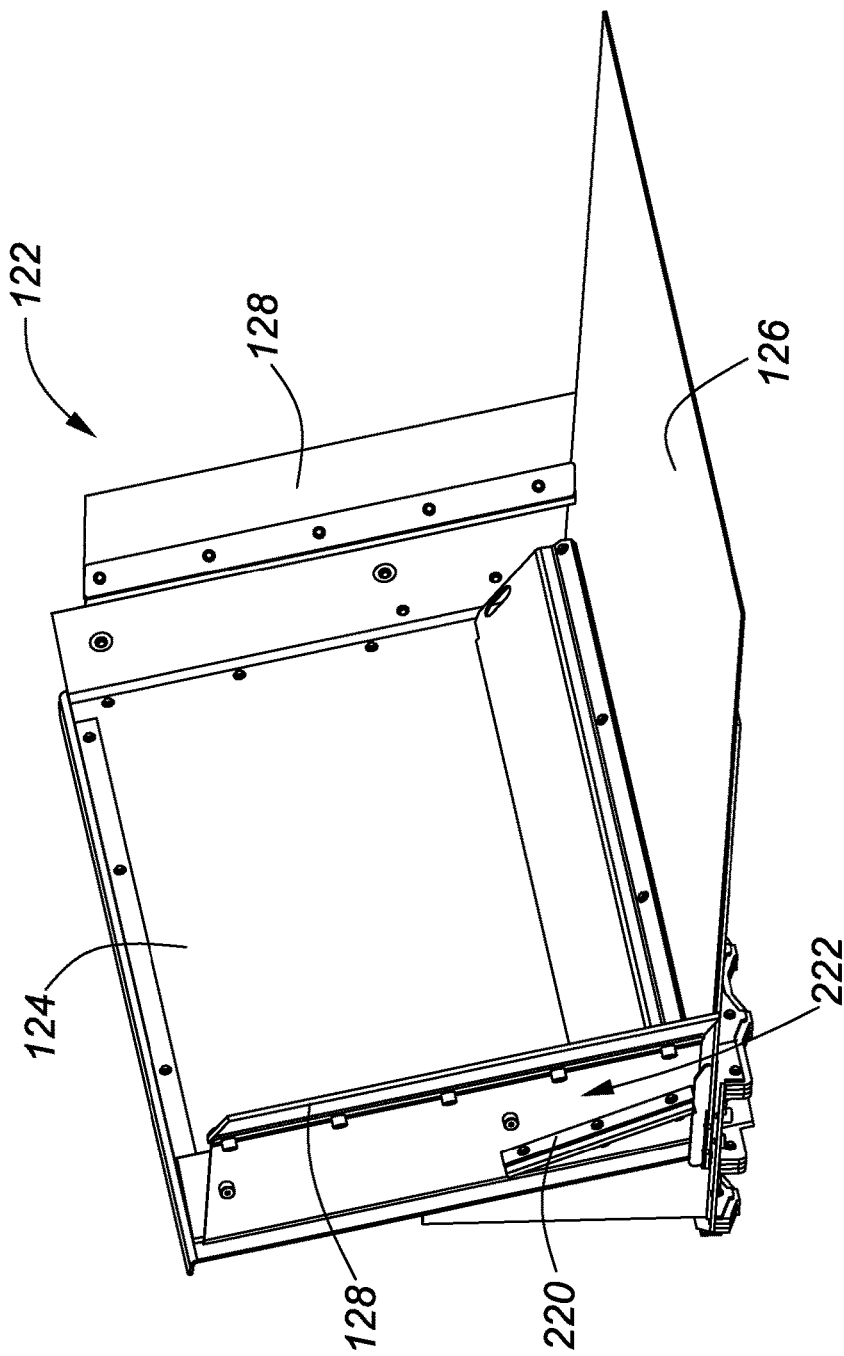
FIG. 10 is a perspective view of a plow of embodiments of the trailer of FIG. 1, wherein the plow is shown in isolation.
Figure 11:
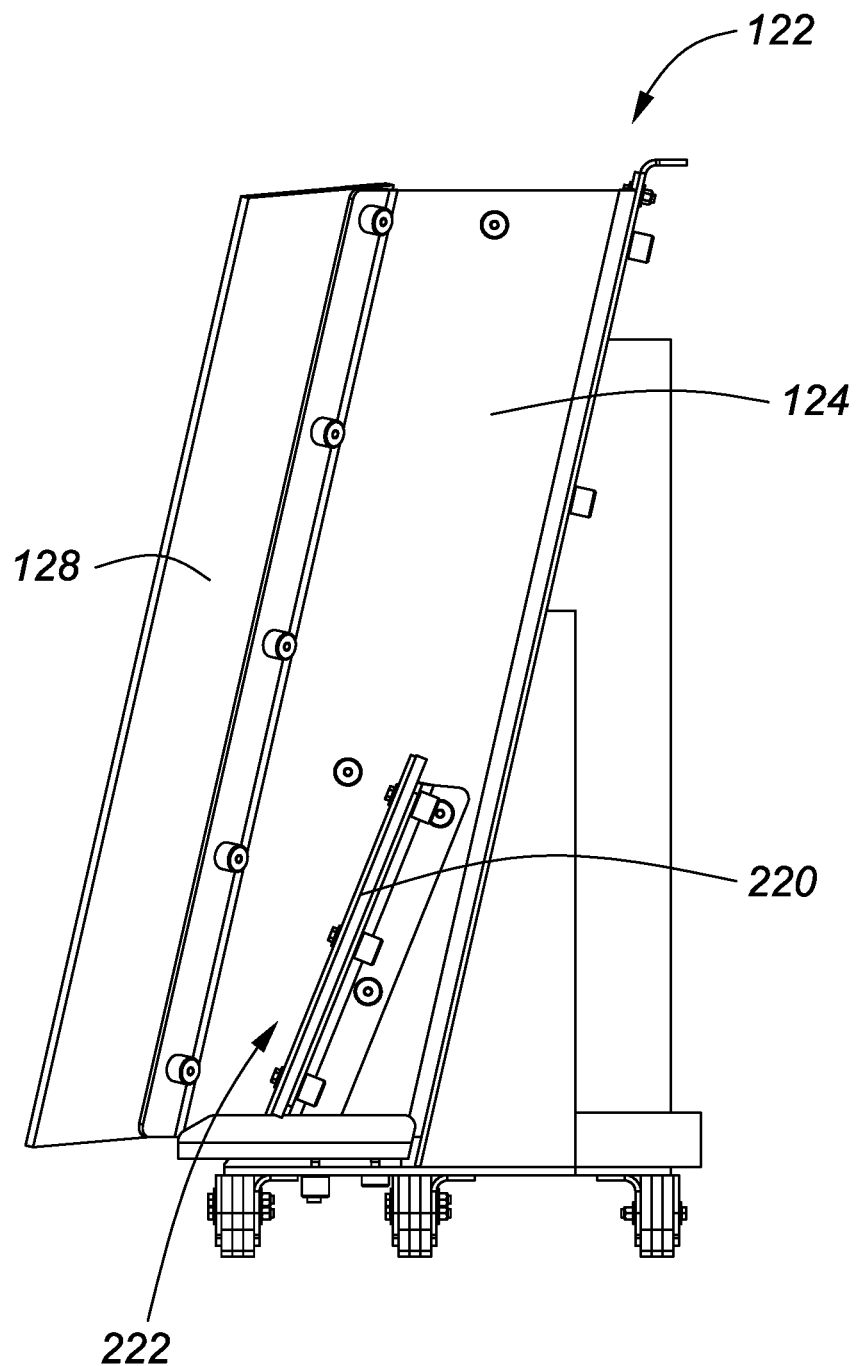
FIG. 11 is a side view of the plow of FIG. 10.

A further improvement for solving the problem of bulk material slipping past the plow wipers is shown in FIGS. 10 and 11 which illustrate the plow 122 in isolation. In this embodiment, an additional secondary wiper 220 is provided which assists in containing bulk material that may pass the wiper 128 which is a primary wiper. Once the plow 122 is moved to the rear of the container 104 the driver or other operator can access the pocket 222 formed by the primary wiper 128 and the secondary wiper 220 to scoop out or brush out any material that may have passed the primary wiper 128. Alternatively, the plow 122 may be configured so as to travel sufficiently far toward the rear opening 112 of the trailer 100 such that the secondary wiper 220 pushes the remaining material entirely out of the container 104. The container 104 may further be provided with a pathway or chute for such purposes. This variant is advantageous for use with an aluminum sidewall wear plate which in some embodiments has a 3/16" offset inside the container 104 where stone chips passing the offset location. Although a secondary wiper 220 is also useful with containers 200 with a flush inside wall with no liner added, a secondary wiper 220 may not be required.

The above embodiments are described in connection with a trailer employing a walking floor and an unloading system which may be a plow for emptying the container of bulk material. It will be appreciated that any sort of unloading system may be employed and the presently-disclosed solutions advantageously applied. In particular, any type of plow motor system may be used, wherein plow motor system is understood to be the means operable to impart motion to the plow to cause it to move longitudinally in the container to urge or push bulk material along and ultimately out of the rear opening. The plow motor system may include any system, machinery, and source of motive force as is convenient and known in the art. As described above, in some embodiments the plow motor system includes a walking floor which lifts and moves the plow. As shown in FIG. 2, the walking floor 118 may employ any suitable machinery 224 to actuate and operate the walking floor 118. In other embodiments, the trailer uses a hydraulic cylinder or the like for pushing the plow to thereby urge or push the bulk material out of the back of the container. In any event, the same problem of imperfect clearing of bulk material may be experienced with certain combinations of bulk material and sidewall material, with bulk material slipping past the plow wipers. The above solutions equally address this problem where a hydraulic cylinder is used instead of a walking floor.

Similarly, the same solution is applicable to any kind of container and any kind of unloading system where, because of the enhanced friction resulting from the combination of bulk material and sidewall material, there is a tendency for the bulk material to slip past wipers where there is any ridge or protrusion from an inner surface of the sidewall. Such problem arises especially where removable panels such as uhmw plastic panels are used in order to obtain the benefits associated with their use. In any such case, the problem may be solved as described above, by providing a precisely coplanar arrangement of the respective inward-facing surfaces of all components of the sidewall.

In the preceding description, for purposes of explanation, numerous details are set forth in order to provide a thorough understanding of the embodiments of the invention. However, it will be apparent to one skilled in the art that these specific details are not required in order to practice the invention. In other instances, well-known structures are shown in schematic or representative form in order not to obscure the invention.

The above-described embodiments of the invention are intended to be examples only. Alterations, modifications and variations can be effected to the particular embodiments by those of skill in the art without departing from the scope of the invention, which is defined solely by the claims appended hereto.

The invention claimed is:

1. A container for a trailer for transporting bulk material, the container comprising:
a sidewall; and
a removable panel slidingly received in the sidewall, wherein:
the removable panel comprises a body having a removable panel thickness and a tongue at an upper edge of the removable panel, the tongue having a tongue thickness less than the removable panel thickness;
the sidewall comprises a sidewall relief sized and is configured to slidingly receive the removable panel, the sidewall relief having a depth approximately equal to the removable panel thickness;
the sidewall comprises a retaining flange extending downwardly into the sidewall relief and a retaining slot formed by a gap between an outward-facing surface of the retaining flange and an opposing inward-facing surface of the sidewall relief;
the tongue thickness is approximately equal to a width of the gap forming the retaining slot; and
the tongue is slidingly received in the slot to retain the removable panel in the sidewall relief.

2. The container according to claim 1, wherein the sidewall is configured to slidingly receive the removable panel longitudinally along a bottom of the sidewall, wherein the tongue is received longitudinally in the slot.

3. The container according to claim 1, wherein an inward-facing surface of the removable panel is flush with an inward-facing surface of the sidewall.

4. The container according to claim 3, wherein the inward-facing surface of the sidewall comprises an inward-facing surface of the retaining flange.

5. The container according to claim 3, wherein the inward-facing surface of the removable panel and the inward-facing surface of the sidewall are flush when the inward-facing surface of the removable panel and the inward-facing surface of the sidewall are substantially free of any profile, ridge, or protrusion greater than 1/16" in extension from a plane of the surface of the removable panel and the surface of the sidewall.

6. The container according to claim 1, wherein the sidewall comprises a first sidewall panel and a second sidewall panel joined to the first sidewall panel, wherein the first sidewall panel and the second sidewall panel together form the sidewall relief, and the first sidewall panel comprises the retaining flange.

7. The container according to claim 6, wherein the second sidewall panel comprises a corner seal formed integrally with the second sidewall panel, the corner seal extending inwardly from the inward-facing surface of the sidewall relief, the corner seal comprising an upward-facing surface to contact and support a lower edge of the removable panel.

8. The container according to claim 7, wherein the upward-facing surface of the corner seal is further configured to contact and support a downward-facing surface of a corner slat of a walking floor when mounted in the container adjacent a bottom corner of the container formed at an intersection of the sidewall and a floor of the container.

9. The container according to claim 8, wherein the removable panel is formed with a lower panel relief sized and shaped to receive an upward-extending arm of the corner slat of the walking floor when mounted in the container.

10. The container according to claim 8, wherein the removable panel comprises a corner slat slot sized and shaped to slidingly receive an upper corner slat tongue bent outwardly from the upward-extending arm of the corner slat.

11. The container according to claim 6, wherein the first sidewall panel is joined to the second sidewall panel at a longitudinal tongue-and-groove joint parallel to a sliding direction along which the removable panel is slidingly received in the sidewall relief.

12. The container according to claim 6, wherein the first sidewall panel and the second sidewall panel each comprise an extruded aluminum panel, and the retaining flange is integral with a body of the first sidewall panel.

13. The container according to claim 1, wherein the removable panel is formed of ultra-high-molecular-weight polyethylene.

14. The container according to claim 1, wherein the sidewall is formed of extruded aluminum panels.

15. The sidewall according to claim 1, wherein the removable panel further comprises a fastening plate relief sized and configured to receive a fastening plate to clamp an end of the removable panel, the fastening plate relief having a depth substantially equal to a thickness of the fastening plate wherein an inward-facing surface of the fastening plate is substantially flush with an inward-facing surface of the removable panel.

16. The container according to claim 15 further comprising a rear post comprising a rear post relief sized and shaped slidingly to receive the removable panel, the rear post relief having a depth approximately equal to the removable panel thickness, wherein the fastening plate clamps the end of the removable panel at the rear post.

17. The container according to claim 15, wherein the removable panel further comprises through holes disposed in the fastening plate relief and sized and shaped to receive bolts for passage through corresponding through holes in the fastening plate to clamp the end of the removable panel.

18. The container according to claim 15 wherein the removable panel is clamped at a rear end of the container and is unrestrained at a front end of the container thereby allowing the removable panel to expand or contract longitudinally.

\* \* \* \* \*